United States Patent [19]

Bond et al.

[11] 4,099,935
[45] Jul. 11, 1978

[54] CUTTING TEETH FOR ETCHED ABRASIVES

[75] Inventors: Herbert M. Bond, Stillwater; Michael E. Rucinski, St. Paul, both of Minn.

[73] Assignee: Buckbee-Mears Company, St. Paul, Minn.

[21] Appl. No.: 764,501

[22] Filed: Jan. 31, 1977

Related U.S. Application Data

[63] Continuation of Ser. No. 627,751, Oct. 31, 1975, abandoned, and a continuation of Ser. No. 489,247, Jul. 17, 1974, abandoned.

[51] Int. Cl.² ............................................. B24D 3/06
[52] U.S. Cl. ................................... 51/309 R; 51/295
[58] Field of Search .................... 51/309, 293, 295

[56] References Cited

U.S. PATENT DOCUMENTS

| | | | |
|---|---|---|---|
| 579,721 | 3/1897 | Peckover | 125/18 |
| 621,225 | 3/1899 | Chandler | 125/18 |
| 852,873 | 5/1907 | Davidson | 76/24 |
| 2,001,911 | 5/1935 | Wooddell et al. | 51/295 |
| 2,825,420 | 3/1958 | Heine | 264/60 |
| 3,045,321 | 7/1962 | McDermott | 29/78 |
| 3,174,363 | 3/1965 | Staiger et al. | 76/101 |
| 3,343,308 | 9/1967 | Fessel | 125/22 |
| 3,918,217 | 11/1975 | Oliver | 51/309 |

*Primary Examiner*—Donald J. Arnold
*Attorney, Agent, or Firm*—Jacobson and Johnson

[57] ABSTRACT

Improved cutting teeth for etched abrading material and process for etching the abrading material are provided wherein the improved teeth comprise substantially flat top posts haing substantially straight or vertical sides. In addition, selected dimensional ratios are maintained between the etched teeth and the thickness of the base material to provide a flexible etching abrasive that has long life and will smoothly and efficiently abrade the surface of an article.

1 Claim, 3 Drawing Figures

CUTTING TEETH FOR ETCHED ABRASIVES

This is a continuation of application Ser No. 627,751, filed Oct. 31, 1975, and a continuation of Ser. No. 489,247, filed 7,17,74, now both abandoned.

BACKGROUND OF THE INVENTION

1. Field of the Invention

This invention relates generally to abrading material and more specifically, to improvements to cutting teeth for etched metallic abrading sheets which are suitable for use in handheld power tools and the like.

2. Description of the Prior Art

Abrading devices and more particularly, etched abrading devices are known in the art as well as methods of making abrading devices. Briefly, there are basically two general types of abrading devices, the metallic abeading devices and the non-metallic abrading devices. The non-metallic abrading devices are characterized by the sheet materials which are commercially known and sold as sandpapers. Metallic abrading devices are generally used for harder materials and include devices such as rasps, files and the like. Within this general category of metallic abrading devices, there is an etched abrading device which is capable of abrading in the same manner as sandpaper yet has considerable greater durability and life than sandpaper. A typical example of this type of abrading device is shown in the McDermott U.S. Pat. No. 3,045,321 which is assigned to the same assignee as the present invention. Typically, the McDermott type of abrading material is etched from metallic sheet material. A portion of the material is etched away to leave a set of regular sharp points for use in abrading the material away. The McDermott type of abrading device utilizes the principle of sharp points which penetrate the surface of the material to be abraded. While abrading rapidly, the McDermott type of abrading device is best suited for producing a roughened rather than a smooth finish.

Another embodiment of the metallic type of etched abrading device is shown in the Davidson U.S. Pat. No. 852,873 in which a knife sharpener is produced by partially undercutting the resist layer to produce a series of regular elongated undercut edges. Davidson suggests that his elongated undercut edges can be used for sharpening knives and the like.

While McDermott and Davidson prior art devices have been known for some time, they have not gained wide acceptance because of certain drawbacks such as the clogging of the abrading material and the inability of the abrading devices to flex and withstand the stress encountered with high speed rotary abrading operations. A cutting tool such as Davidson plugs up quite readily if used in high speed operation with a soft material. Furthermore, the Davidson device is inflexible and will not conform to the surface of the material to be abraded. While abrading cylinders or drums can be made from flat abrading sheets such as McDermott, they do have a drawback as they are difficult to form the cylinders for use in high speed operation. An improvement to this type of abrading device for use in drums is shown and described in the co-pending application of Herbert M. Bond, Ser. No. 237,734, filed March 24, 1972 now abandoned, titled "Abrading Devices" in which improvements to teeth spacing and fastening are described to provide an improved abrading device that has long life and is non-clogging.

The present invention, in contrast to these prior art etched abrading devices, comprises an improvement to the teeth of the etched abrading device. That is, the present invention provides a set of cutting teeth or posts which do not penetrate the material to be abraded. This is in direct contrast to prior art etched abrasives which have sharp points to penetrate the surface of the material being abraded. The present invention is found to provide a smoother finish than prior art devices with a cutting rate and abrasive life better than prior art etched abrasives.

Thus, the present invention eliminates the problems of furrowing or gouging associated with the cutting teeth of the prior art etched abrasive materials utilizing sharp points. An added feature is that the elimination of the furrowing has not been done at the expense of either the life of the abrading article or the cutting efficiency of the abrading material. Therefore, the present invention has its greatest utility where it is desired to rapidly cut a smooth surface. However, if a roughened surface is desired, the McDermott device would be preferred.

Another aspect of the invention is that certain ranges of abrasive sizes have been found which insure that one can provide an etched abrasive set of cutting teeth which will coact smoothly and effectively to rapidly abrade away material.

SUMMARY OF THE INVENTION

Briefly, the present invention comprises a metallic abrading material having improved cutting teeth which have a substantially horizontal top and substantially vertical side walls and the ratio of the depth of etch to the total thickness of the material as well as other ratios are maintained within certain ranges to provide an efficient cutting material that smoothly and effectively removes material from the surface of an article.

DESCRIPTION OF THE PREFERRED EMBODIMENT

Figure 1:
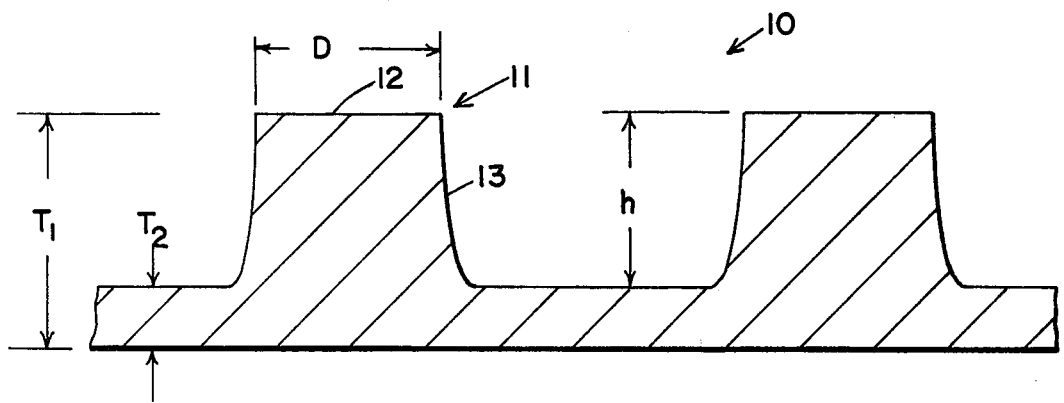
FIG. 1 shows a cross section elevational view of the improved cutting teeth of this invention.

Referring to FIG. 1, reference numeral 10 designates a cross section elevation view of two of the improved cutting teeth of the present invention. For purposes of describing the improved cutting teeth, reference should be made to reference numeral 11 which designates a single tooth having a substantially flat top 12 and substantially vertical sides 13. It should be noted that the tooth has the appearance of a post projecting from the remaining base material. While it is apparent that a single cutting tooth does not form an abrading device, a single tooth must be examined in order to understand the cutting effectiveness of the present abrading device.

In the preferred embodiment, tooth 11 has a circular top that ranges in size from about 0.0015 inch to about 0.004 inches with the diameter of about 0.003 inches being the optimum. It has been found that if the diameter of the top is less than 0.0015 inch, the tops will penetrate into the article and produce a furrowed or roughened surface. Thus, one of the features of the present invention is the tops of the material should have a dimension greater than 0.0015 inch and be substantially flat to prevent the teeth from piercing the surface of the article to be abraded.

Referring to FIG. 1, the total thickness of the teeth and the backing sheet is designated by $T_1$ and the thickness of the remaining backing is designated by $T_2$. The major dimension of the top of the tooth is designated by D and in the preferred embodiment the cross sectional configuration is circular, however, an irregular shape such as ellipse, square or the like are also suitable for use.

The distance from the top of the tooth to the base is designated by H and corresponds to the amount of material that is etched away from the base sheet during the etching process. While it is apparent that a single tooth cannot smoothly abrade the surface of the article, it has been found that to obtain a smooth finish, certain relationships between the individual tooth dimension and the overall thickness of the material should be observed.

The first dimension used as a guideline for designing an etched abrasive is the top diameter of the tooth D. Experimental results have shown that if D ranges from about 0.0015 to about 0.004 inches, there is sufficient material and surface area so that the teeth do not penetrate the article being abraded but instead smoothly shear away the material on the top of the article being abraded.

The second dimension of significance is the etched depth H. It has been found that if the depth H ranges from about 0.0025 inches to about 0.0065 inches, there is sufficient rigidity to shear the material properly yet there is also sufficient flexibility to enable one to smoothly follow the contour of the article being abraded.

If flexibility of the abrading device is desired, the dimension $T_2$ should not exceed 0.0025 inches and preferably be in the range of about 0.001 inches to about 0.0025 inches.

While the shape and position of the teeth have been described in detail, it is apparent that part of this invention is the process of making the teeth in substantially a post-like pattern on the metallic abrasive sheet.

Figure 2:
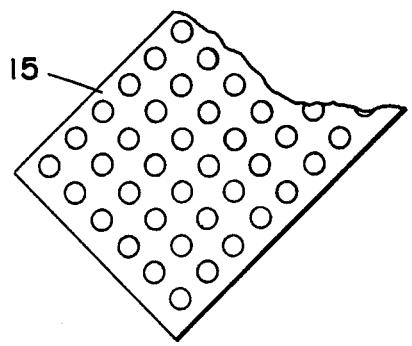
FIG. 2 shows a top view of the cutting teeth of this invention.

Referring to FIG. 2, reference is made to a sheet of metallic material 15 having a plurality of cutting teeth located thereon. It can be seen that the teeth are located in a somewhat spaced regular pattern and in the preferred embodiment have a density of approximately 700 to 900 teeth per square inch. This density may vary up or down but it has been found that the most efficient cutting is obtained if the density is in the order of 700 to 750 teeth per square inch.

Figure 3:
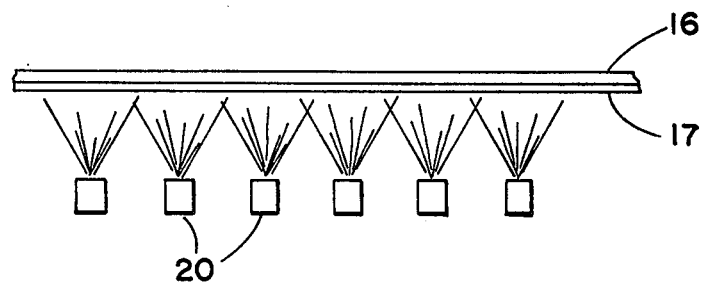
FIG. 3 shows the process of etching the post-like teeth.

Referring to FIG. 3, reference numeral 16 indicates the metallic material to be etched and reference numeral 17 indicates the layer of photoresist having the desired tooth pattern thereon. Located beneath material 16 is a set of nozzles 20 which are spraying etchant vertically upward onto the protective coating on the abrading material sheet. The purpose of spray etching the abrading sheet while in a horizontal position is that the undercutting, etc. is minimized or substantially eliminated to thus give a post-like pattern appearance which is shown in FIG. 1. Thus, to obtain a postlike pattern of cutting teeth, it is preferred to etch the backing material from underneath.

In order to compare the test results between a different pattern and density, a number of examples were tested and compared. The following are some of the abrading materials that were tested.

EXAMPLE 1

A sheet of material having a thickness T of 0.010 was etched until a backing $T_2$ of 0.005 remained. The cross section configuration of the teeth was circular with the diameter $D = 0$. That is, the teeth had sharp points. The density of the teeth was about 2000 teeth per square inches. This unit was used to abrade pine and copper and the removal rates were 3.3 grams per five minutes for the pine and 0.2 grams per five minutes for the copper. The abraded surface contained fine scratches and was characterized as a roughened surface.

EXAMPLE 2

A sheet of material having a thickness T of 0.008 was etched until a backing $T_2$ of 0.0015 inches remained. The cross sectional configuration of the teeth was circular with the diameter D of about 0.002 inches. The density of the teeth ranged from 700 to 750 teeth per square inch. The unit was used to abrade pine and copper and the removal rate was 6.0 grams per 5 minutes for the pine and 0.4 grams per 5 minutes for the copper. The abraded surface was smooth.

EXAMPLE 3

A sheet of material having a thickness $T_1$ of 0.006 was etched until a backing $T_2$ of 0.0035 remained. The cross sectional configuration of the teeth was circular with the diameter $D = 0.008$ inches. The density of the teeth ranged from 520 to 550 teeth per square inch. The unit was used to abrade pine and copper and the removal rate for pine was 1.05 grams per five minutes and the removal rate for copper was 0.05 grams per five minutes. The abraded surface was smooth.

EXAMPLE 4

A sheet of material having a thickness $T_1$ of 0.004 was etched until the backing $T_2$ of 0.0015 inches remained. The cross sectional configuration of the teeth was circular with a diameter D of about 0.016 inches. The density of the teeth ranged from 350 to 375 teeth per square inch. The unit was used to abrade pine and copper and the removal rate was 0.10 grams per five minutes for the pine and 0.10 grams per 5 minutes for the copper. The abraded surface was smooth.

EXAMPLE 5

A sheet of material having a thickness T of 0.004 was etched until a backing $T_2$ of 0.0015 inches remained. The cross sectional configuration of the teeth was circular with the diameter $D = 0.003$ inches. The density of the teeth ranged from 870 to 920 teeth per inch. The unit was used to abrade pine and copper and the removal rate for pine was 0.4 grams per five minutes and 0.05 grams per five minutes for the copper. The abraded surface was smooth.

From the above examples it was found that it was necessary to maintain a minimum dimension D of at least 0.0015 inches on the teeth to prevent the teeth from producing a roughened surface. In addition, the teeth should have flat tops with substantially vertical sides and an etched depth H that is a minimum of 0.0025 inches. The other dimensions can be varied within wide ranges to either increase or decrease the cutting rate of the abrasives. However, for most applications it is desired to have a fast cutting rate that produces a smooth finish.

We claim:

1. A one piece abrading device for smoothly abrading away material, said abrading device comprising a flexible base member having rigid abrading teeth thereon, said base member and said abrading teeth comprised of the same metallic base material, said base member defined by a width, a thickness and a length; said thickness of said abrading member being substantially of less dimension than said width and said length so that said base member lacks rigidity and flexes in response to a force on the surface of said base member, said abrading teeth comprising a plurality of metallic post-shaped cutting teeth spaced widthwise and lengthwise across said base member, said abrading teeth having a rigid top cutting surface, said teeth characterized by being distributed throughout said base member to thereby provide said abrading device with tooth density of approximately 700 to 900 teeth per square inch so as to smoothly shear away material on the surface of an article to be abraded when said abrading device is rubbed over the article to be abraded, said cutting teeth integrally formed with said base member and projecting a distance H from said base member, said plurality of postshaped cutting teeth having a substantially flat top and substantially vertical side walls, said substantially flat top of said plurality of post-shaped cutting teeth having a diameter designated by D, said diameter of said teeth having a minimum dimension of about 0.0015 inches to prevent said teeth from piercing the surface of the article to be abraded with said dimension H of said teeth having a minimum dimension of about 0.0025 inches to thereby produce abrading teeth which are sufficiently rigid to smoothly abrade away material.

* * * * *